June 9, 1931.  J. W. MILNOR  1,809,560
ARTIFICIAL LINE NETWORK
Filed April 12, 1929   2 Sheets-Sheet 1
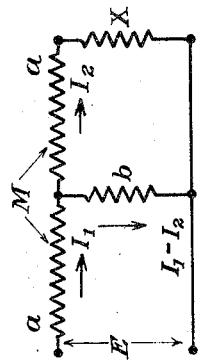
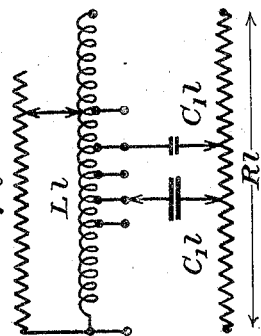
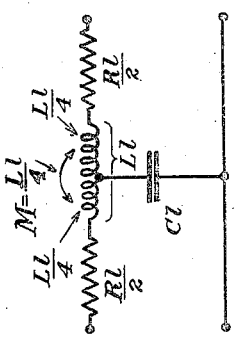
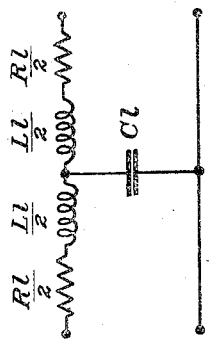
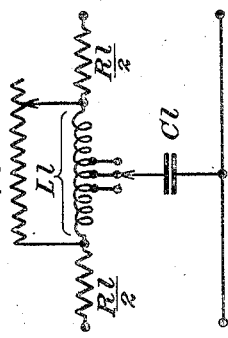
Inventor
J. W. Milnor
Eugene C. Brown
Attorney

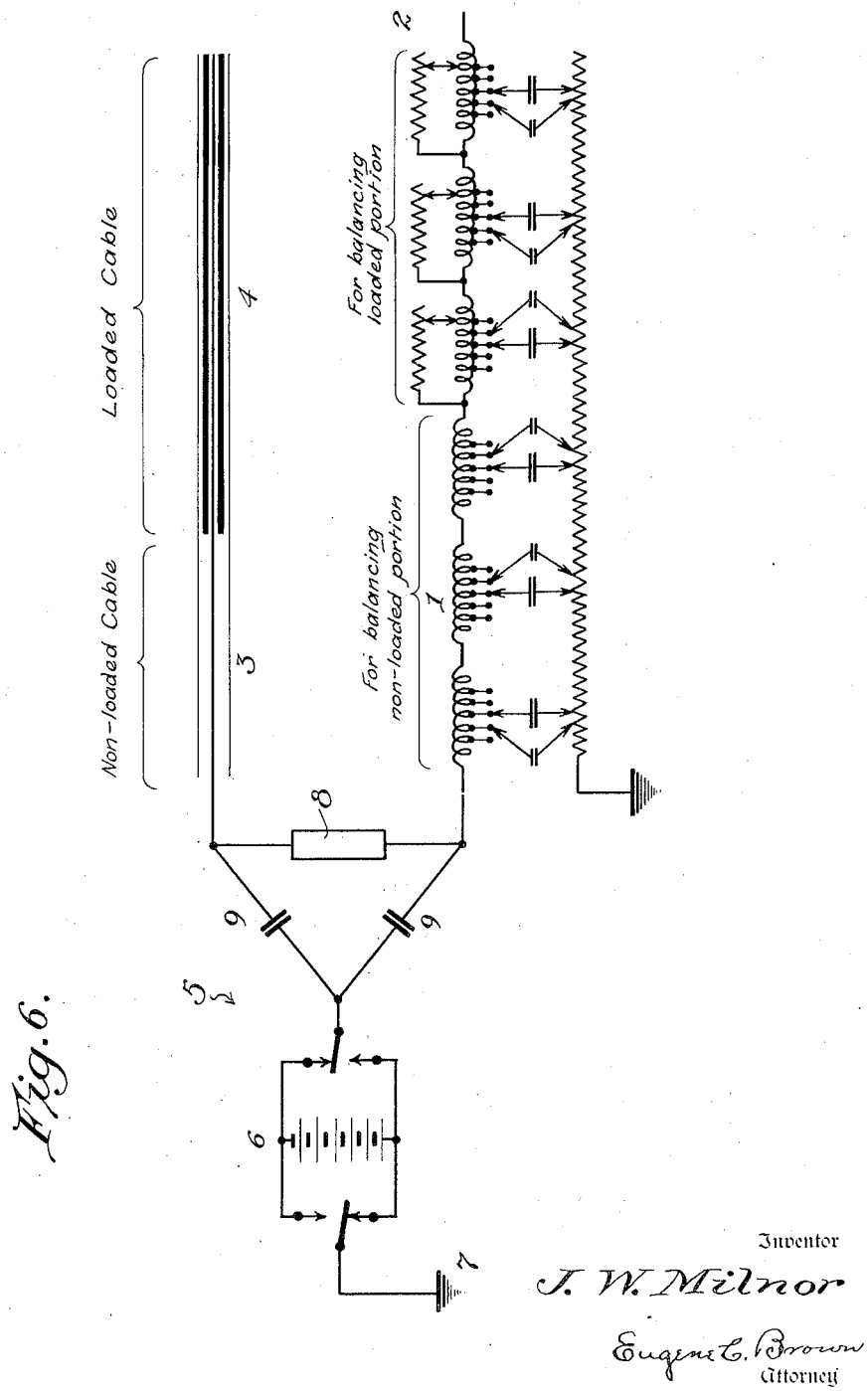

Patented June 9, 1931

1,809,560

UNITED STATES PATENT OFFICE

JOSEPH W. MILNOR, OF MAPLEWOOD, NEW JERSEY, ASSIGNOR TO THE WESTERN UNION TELEGRAPH COMPANY, OF NEW YORK, N. Y., A CORPORATION OF NEW YORK

ARTIFICIAL LINE NETWORK

Application filed April 12, 1929. Serial No. 354,573.

This invention relates in general to artificial line networks, and in particular to a type of network which is especially adapted for accurately balancing a transmission line having inductance. The principles underlying the invention may be applied to artificial networks for balancing both loaded lines and non-loaded lines, since the latter ordinarily have more or less inherent inductance.

In the customary arrangement for duplexing a transmission line, it is necessary to provide an artificial line the resistance, capacity, inductance and leakage characteristics of which are approximately equal to those of the line, or bear some fixed ratio, other than unity, to those of the line. If the line is not loaded, its inductance will be small in value and can be represented, for approximate balance, by the addition of a small amount of inductance in the artificial line. Or recourse may be had to special means such as the introduction of resistances in series with the shunt condensers of the artificial line for balancing the transmission line inductance, as disclosed in my prior Patent No. 1,519,870, granted December 16, 1924. Frequently the inductance balance is omitted altogether, where approximate balance can be secured without it, or where a high order of balance is not absolutely necessary.

A submarine cable is an example of a type of transmission line which requires a very high order of conjugacy between the line and artificial line. This invention, therefore, will be considered with special reference to submarine cables, but is not to be understood as restricted thereto, but as applicable to all cases in which a high degree of accuracy of balance is necessary or desired.

The principal objects of the invention are:

To provide a balancing network for a signaling conductor having inductance, which shall simulate the characteristics of the conductor to a greater degree of accuracy than has been possible in previously known artificial lines, so that duplexing of such conductors can be more readily accomplished.

To provide accurate balance, or simulation, of the signaling conductor over a wide range of signaling frequencies, and, in particular, to extend the range of frequencies for which accurate balance exists, to include higher frequencies at which there has heretofore been an appreciable departure of the impedance of the artificial line from that of a smooth signaling conductor.

To reduce the number of unit sections of artificial line required to obtain an accurate duplex balance.

To simplify the construction of artificial loaded line sections.

To provide loss-producing means for balancing, or correcting for, losses in material used for loading of conductors.

To effect economies in cost and in space requirements of duplex balancing line sections.

To provide adjusting means for these units which will facilitate the balancing procedure.

The desired objects are obtained, as will appear in the following description, by the use of a limited number of T-type line sections comprising series inductance and resistance with a shunt capacity connected to an intermediate point near the center of the inductance so that mutual inductance exists between the two portions of the coil, the point of connection of one or both terminals of the shunt capacity to the series impedances preferably being made adjustable within limits, and the values of the individual elements of a section being adjusted to satisfy an equation which will be developed hereinafter. The balancing losses are introduced by proper adjustment of the magnitude and position of a resistive shunt about the whole or a part of the coil providing mutual inductance.

The invention will be explained in detail by reference to the annexed drawings in which:

Figure 1 shows an element or section of artificial line having a succession of simple elements containing inductance;

Figure 2 is a diagrammatic representation of a T-type section of artificial line terminated in an impedance which is preferably an equivalent impedance or surge impedance of the line. The purpose of Fig. 2 is to assist in the explanation of the theoretical principles involved.

Figure 3 shows a section embodying the fundamental principles of the present invention;

Figure 4 and 5 are sections illustrating certain other features of the artificial line according to this invention; and Figure 6 illustrates the use of the type of artificial line herein disclosed and claimed as applied to one type of loaded cable.

To facilitate a clear understanding of the invention, it may be well to call to mind certain features of the design and construction of artificial lines as heretofore known. In order to accurately balance a long transmission line, it is common practice to use a multiplicity of sections in the artificial line, each section simulating a corresponding portion of the rear line. To obtain a high degree of accuracy a very large number of sections are required, thus necessitating an expensive, complex, and bulky artificial line. This invention, on the other hand, contemplates a reduction in the number of sections necessary to secure a good balance, thus effecting marked economies in cost and in space requirements, and at the same time allowing a simplification in the procedure of securing and maintaining a satisfactory balance.

It has been discovered that an artificial line section comprising series inductance and resistance with a shunt capacity connected to an intermediate point near the center of the inductance so that mutual inductance exists between the two portions of the coil, can be made to balance a long section of line having approximately smooth inductance, with a degree of accuracy attainable otherwise only by the use of a much larger number of artificial loaded line sections of the type commonly found in practice.

The theory underlying the action of an artificial line section possessing separated series inductances and having mutual inductance therebetween and having a shunt impedance located between the mutually related inductances, has been developed and is outlined in that which follows. In developing this theory, consider first the equation representing the impedance of a long transmission line. Compare with this the equation for the impedance of an infinitely long artificial loaded line comprised of sections having no mutual inductance. (Fig. 1.) It will be shown that there is a substantial departure of the impedances of these two lines, and that this departure increases rapidly at high frequencies. The magnitude of this departure is expressed by a second term in the equation for the impedance of the artificial line and will be referred to hereinafter as the "correction factor". Next, is developed the equation for an artificial line whose sections have mutual inductance between the series elements. One type is shown in Fig. 3. It will appear that in the final expression for the impedance of this artificial line the correction factor is independent of inductance. Consequently by the use of the artificial line embodying mutual inductance the correction factor is very greatly reduced in importance.

As is well known, the impedance of a long transmission line (ignoring leakance) is given by the expression $$Z = \sqrt{\frac{R+j\omega L}{j\omega C}} \quad (1)$$

The impedance of an infinite number of sections of simple T-type artificial loaded line (Fig. 1), without mutual inductance, can be expressed by the equation:

$$Z = \sqrt{\frac{R+j\omega L}{j\omega C}} \sqrt{1 + \frac{l^2 j\omega CR}{4} - \frac{l^2 \omega^2 CL}{4}} \quad (2)$$

in which R, L and C represent the resistance, inductance, and capacity, respectively of a unit length of the actual line which it is desired to balance;

$$\omega = 2\pi f, \; j = \sqrt{-1}$$

and $l$ is the number of unit lengths of line which is balanced by each section of artificial line. It has been assumed that the fixed ratio between the impedance of the line and that of the artificial line has been made unity, as is usually the custom.

The first term of equation (2) is the exact expression for the impedance of the smooth loaded line, while the second term expresses the degree of the departure of the impedance of the artificial line from that of the smooth line. It will be noted that this departure increases rapidly at the higher frequencies. In the artificial line of this invention, however, this correction factor is substantially reduced in importance.

My artificial line is shown in general form in Fig. 2, in which $a$ represents each of the two similar series impedances, M represents the mutual impedance therebetween and $b$ represents the shunt impedance. The network is terminated in a surge impedance $x$. If a voltage E is applied to the network, a current $I_1$ will flow in the first series element, a current $I_2$ in the second series element, and a current $I_1 - I_2$ in the shunt element.

By Kirchoff's Laws,—

$$E = aI_1 + MI_2 + (I_1 - I_2)b$$

and $\quad (a+x)I_2 + MI_1 = (I_1 - I_2)b \quad (3)$ or $\quad \dfrac{I_2}{I_1} = \dfrac{M-b}{a+b+x}$ The impedance of the network is,—

$$Z = \frac{E}{I_1} = a + b + (M-b)\frac{I_2}{I_1} \quad (4)$$

Combining (3) and (4)

$$Z = \frac{(a+b)(a+b+x) - (M-b)^2}{a+b+x}$$

Since the network terminates in an equivalent impedance:

$$x = Z = \frac{(a+b)(a+b+x) - (M-b)^2}{a+b+x}$$

Solving for $x$:

$$x = \sqrt{(a+b)^2 - (M-b)^2} \quad (5)$$

This equation is a general expression for the surge impedance of a T-section artificial line which has mutual impedance between the series elements.

Consider now the special case of this type of artificial line which is illustrated in Fig. 3. The symbols here have the same meaning as in Fig. 1, and the general terms of equation (5) may be expressed as follows, providing that the two halves of the coil are closely coupled, as they would be if wound on the same core:

$$a = \frac{1(2R+j\omega L)}{4}; \quad b = \frac{1}{j\omega C 1}; \quad M = \frac{j\omega L 1}{4}$$

The impedance of this network will be:

$$x = \sqrt{\frac{1^2 R(R+j\omega L)}{4} + \frac{R+j\omega L}{j\omega C}}$$

$$= \sqrt{\frac{R+j\omega L}{j\omega C}} \sqrt{1 + \frac{1^2 j\omega CR}{4}} \quad (6)$$

Comparing this final expression for the surge impedance of the artificial line of Fig. 3, with equations (1) and (2) it is seen that the correction term is independent of inductance. In practice, it is found that for a given length of section $l$, the artificial line containing mutual inductance represented by equation (6) furnishes a much more accurate balance than the line without mutual inductance as represented by equation (2). Conversely, a given accuracy of balance may be obtained while using sections of much greater length, i. e., greater value of $l$, with the line having mutual inductance.

The advantage of the line having mutual inductance is especially important in balancing a loaded conductor; in balancing a non-loaded line having relatively smaller self inductance, the advantage of the artificial line containing mutual inductance is less marked but is still valuable.

It may be shown that a further refinement in balance may be made by placing each condenser slightly away from the center of the coil. Thus if each condenser is placed ahead of the center of the coil by an amount $\eta$ expressed as a fraction of the total number of turns in the coil, the impedance of a series of such units is equal to .

$$\text{Impedance} = -j\omega L 1 \eta +$$

$$\sqrt{\frac{R+j\omega L}{j\omega C}} \sqrt{1 + \frac{j\omega CR1^2}{4} - \omega^2 CL1^2\eta^2} \quad (7)$$

This expression was developed by the same methods used in developing equation (6).

Expanding by the binomial theorem $$\text{Impedance} = \underbrace{-j\omega L 1 \eta}_{(a)} +$$

$$\underbrace{\sqrt{\frac{R+j\omega L}{j\omega C}}}_{(b)} \left(1 + \underbrace{\frac{j\omega CR1^2}{8}}_{(c)} - \underbrace{\frac{\omega^2 CL1^2\eta^2}{2}}_{(d)}\right) \quad (8)$$

This expression is a close approximation to equation (7) if $l$ is fairly small.

In equation (8), term $(d)$ is negligible if $\eta$ is small. Then term $(a)$ may be made to partly or almost completely cancel term $(c)$, particularly where the line is loaded, in which $$\frac{\omega L}{R}$$

is large. In one case a suitable value for $\eta$ was found to be about .002. Under these circumstances equation (8) becomes equal to the impedance of the smooth line, to a high degree of approximation.

It is found that the advantages of a line containing mutual inductances are not greatly impaired if the connection of each individual condenser to the coil departs somewhat from the ideal position along the coil, providing that the departure is not greater than about one sixth of the total number of turns in the coil. Advantage may be taken of this fact in making the final adjustment of the balance. For this purpose, the coil may be provided with a number of taps near the center, and the final adjustment may be made by moving the condenser from one tap to another as needed.

It is known that a loaded cable always has more or less loss in the inductance loading, the major portion of the loss being due to eddy currents. Such losses may be matched in an artificial line by providing each coil of the artificial line with a secondary winding, and closing the secondary winding through a suitable resistance. I have found, however, that eddy current losses may be balanced with sufficient accuracy simply by connecting a suitable resistance in parallel with part or all of each coil. This statement is conditional upon the coil having low ohmic resistance as compared with its reactance (i. e. $2\pi f$ L 1) and is usually the case in practice. Since the value of the resistance $r$ is several times the reactance of the coil, the presence of resistance $r$ does not greatly alter the theory of the use of coil with mutual inductance as represented by equation (6).

In the practical embodiment of this invention, it is more convenient to place the resistance elements, for correcting the ohmic resistance of the cable, on one side of the condensers; with the inductance elements placed on the opposite side of the condensers as shown in Fig. 5. The correction for eddy current resistance would then be placed in parallel with part or all of the inductance.

It is also expedient to break the condenser into two parts, of which one part $C_1 1$ represents the major portion of the capacity. $C_2 1$ has a much smaller capacity, preferably between 1/20 and 1/5 of the size of $C_1 1$. By so doing, $C_1 1$ may be moved during the preliminary stages of the adjustment, $C_2 1$ being kept fixed in position, and $C_2 1$ may be moved, ($C_1 1$ being held in fixed position) during the final adjustments of the balance, where a high degree of accuracy is to be obtained. $C_2 1$ may be considered to be a vernier adjustment condenser.

Referring now to Fig. 6, there is disclosed the application of such a balancing line to an ocean cable of the type shown in my Patent 1,607,473 dated Nov. 16, 1926. In this system, the artificial line is made up of two parts, 1 and 2, of which the part 1 serves to balance the non-loaded portion 3 of the cable, while the part 2 balances the loaded portion 4 of the cable. The terminal station, of which one only is shown, is designated generally by the reference numeral 5. It is to be understood that there is another, preferably similar terminal station at the other end of the cable, which may also comprise an unloaded portion in series with the loaded cable, the two portions being balanced for duplex operation by their respective artificial line sections designed in accordance with the principles herein disclosed.

The transmitting apparatus is represented conventionally, at 6, as comprising means for connecting the positive and negative poles of the local source alternately to line and to ground 7 in accordance with the signal impulses to be transmitted.

The receiving apparatus, represented generally at 8, is associated in conjugate relation to the transmitting apparatus 6, by ratio arms comprising condensers 9, 9. As is well understood, the condensers 9, 9 form two arms of a Wheatstone bridge arrangement of which the cable and the artificial line form the third and fourth arms, some or all of the elements of the artificial line being normally made adjustable in order to regulate the condition of balance of the Wheatstone bridge and to thus establish and maintain conjugacy of the transmitting and receiving channels.

It is obvious that the artificial line should be so designed that the state of balance, or condition of conjugacy, may be established simply and with as few adjustments as possible while still providing a high order of accuracy of balance. In the system disclosed in Fig. 6, a high degree of accuracy is obtained by two expedients, first, by modifying the loaded cable by the introduction of a non-loaded portion at the shore end so that the load portion terminates at a considerable distance from the shore, and, second, by balancing each portion of the cable by its own artificial line and designing the artificial lines in accordance with the principles of this invention. Thus the artificial line portion 1 which balances the non-loaded cable section is composed of a plurality of sections according to Fig. 5 in which the resistance shunts $r\,1$ are missing,—or, considered from another point of view, in which the value of the resistance $r\,1$ is infinite,—while the portion 2 which balances the loaded cable is composed of a limited number of sections according to Fig. 5 in which the value of resistance $r\,1$ is finite and adjusted to compensate for the eddy current losses in the material used for loading the conductor.

The resistances, inductances, and capacities are independently adjustable in order to facilitate the procedure of balancing the cable. As a further refinement in balancing, each shunt capacity is capable of two adjustments, a coarse adjustment in which the major part $C_1 1$ is adjustable within a small region near the center of the inductance, and a finer or vernier adjustment in which the remaining small portion $C_2 1$ of the total shunt capacity element is separately adjustable for a final balance.

It is to be understood that the methods and means herein described are not restricted in their applicability to the particular type of cable mentioned but are adapted for use with any kind of signaling conductor.

I claim:

1. An artificial line comprising a series inductance provided with a plurality of central taps, a shunt condenser, an auxiliary shunt condenser having a capacity small with respect to that of the first mentioned condenser, and means for adjustably connecting each of said condensers to said central taps.

2. An artificial line comprising series inductances having mutual inductance therebetween and having a shunt impedance located between the mutually related inductances, in combination with a resistance shunt around at least a portion of the series inductance.

3. An artificial line comprising series inductances having mutual inductance therebetween and having a shunt impedance located between the mutually related inductances, in combination with a resistance shunt around at least a portion of the series inductance, the ohmic resistances of said shunt being high compared with the reactance of the inductance coil.

4. An artificial line comprising a finite number of recurring sections, the equation of whose impedance comprises two terms of which one is the impedance of the simulated or balanced line and the other a term free of inductance expressing the magnitude of the balance error.

5. An artificial balancing line made up of T-sections comprising self and mutual inductances, resistance and capacity, the elements of the section being so proportioned and arranged that the variation of its impedance with respect to the impedance of the line to be simulated is independent of the inductance.

6. An artificial line designed to balance a loaded conductor comprising a finite number of sections having an impedance expressible by the equation:

$$Z = \sqrt{\frac{R+j\omega L}{j\omega C}} \sqrt{1 + \frac{1^2 j\omega CR}{4}}$$

where 1 is the number of unit lengths of line balanced by each section of the artificial line.

7. A T-section artificial line made up of a series element and a plurality of shunt elements of different values comprising capacity, the series element including an inductance having a plurality of taps near its center, and means for connecting each of said shunt elements to any desired one of the plurality of taps.

8. A T-section artificial line comprising a series element and a two-part shunt element connectable along the length of the series element, said shunt element comprising two condensers one of which is small with respect to the other, means for variably connecting the larger condenser to said series element for establishing a condition of approximate balance, and means for variably connecting the smaller condenser to said series element to provide vernier adjustment of the balance.

9. A T-section artificial line designed to simulate a loaded conductor, having mutual impedance between the series elements, and means in shunt to at least a portion of the series element for introducing losses analogous to the eddy current losses in the loaded conductor.

10. A T-section artificial line designed to simulate a loaded conductor, comprising a series element providing self and mutual inductance, a shunt element providing capacity, and a resistive path in shunt to at least a portion of said inductance having a resistance which is large compared to the ohmic resistance of the inductance.

11. An artificial line section comprising series inductance, series resistance, a shunt condenser adjustably connectable to intermediate points on said inductance and said resistance, and an auxiliary condenser adjustably connectable to intermediate points on said inductance and said resistance, the auxiliary condenser having a capacity small with respect to that of the first mentioned condenser, whereby vernier adjustment of the line balance may be secured.

12. An artificial line section comprising series inductance, series resistance, a shunt condenser adjustably connectable to intermediate points on said inductance and said resistance, and a variable-resistance path connected around at least a portion of said series inductance.

13. An artificial line section comprising series inductance, series resistance, a shunt condenser adjustably connectable to intermediate points on said inductance and said resistance, and a variable-resistance path adjustably connectable around at least a portion of said series inductance.

14. An artificial line section comprising series inductance, series resistance, a shunt condenser adjustably connectable to intermediate points on said inductance and said resistance, an auxiliary condenser having a capacity small with respect to that of said shunt condenser adjustably connectable to intermediate points on said inductance and said resistance, and a resistive path connected around at least a portion of said series inductance.

15. An artificial line section comprising series inductance, series resistance, a shunt condenser adjustably connectable to intermediate points on said inductance and said resistance, an auxiliary condenser having a capacity small with respect to that of said shunt condenser adjustably connectable to intermediate points on said inductance and said resistance, and a variable-resistance path connected around at least a portion of said series inductance.

16. An artificial line section comprising series inductance, series resistance, a shunt condenser adjustably connectable to intermediate points on said inductance and said resistance respectively, an auxiliary condenser having a capacity small with respect to that of said shunt condenser adjustably connectable to intermediate points on said inductance and said resistance respectively, and a variable-resistance path adjustably connectable around at least a portion of said series inductance.

17. A duplex signaling system comprising a loaded conductor, terminal apparatus, and a non-loaded conductor between the terminal apparatus and the loaded conductor; an artificial line comprising mutual inductance connected to said terminal apparatus for balancing the non-loaded conductor, a similar artificial line connected to said first mentioned artificial line for balancing the loaded conductor and resistances connected in shunt to inductances of said second mentioned artificial line for correcting for eddy current losses in the loading material of said loaded conductor.

18. In a system for balancing the inductance of a long smooth signaling conductor having resistance, capacity and inductance distributed along its length, a succession of inductance coils provided with a plurality of taps, shunt condensers connected to certain of said taps, a major portion of the capacity of said condensers being connected to the taps near the centers of the coils.

In testimony whereof I affix my signature.

JOSEPH W. MILNOR.